United States Patent
Jin et al.

(10) Patent No.: US 11,413,602 B2
(45) Date of Patent: Aug. 16, 2022

(54) ORGANIC POLYMER ADSORBENT, COMPOSITION OF ORGANIC POLYMER ADSORBENT AND METHOD OF MANUFACTURING THEREOF

(71) Applicant: LG ELECTRONICS INC., Seoul (KR)

(72) Inventors: Taegyu Jin, Seoul (KR); Yong Ki Jeong, Seoul (KR); Janghee Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 383 days.

(21) Appl. No.: 16/479,479

(22) PCT Filed: Jan. 2, 2018

(86) PCT No.: PCT/KR2018/000048
§ 371 (c)(1),
(2) Date: Jul. 19, 2019

(87) PCT Pub. No.: WO2018/135775
PCT Pub. Date: Jul. 26, 2018

(65) Prior Publication Data
US 2019/0336942 A1 Nov. 7, 2019

(30) Foreign Application Priority Data
Jan. 20, 2017 (KR) .......................... 10-2017-009539

(51) Int. Cl.
| | | |
|---|---|---|
| *B01J 20/26* | (2006.01) | |
| *B01D 53/26* | (2006.01) | |
| *B01D 53/28* | (2006.01) | |
| *B01J 20/28* | (2006.01) | |
| *B01J 20/30* | (2006.01) | |
| *C08F 212/08* | (2006.01) | |
| *C08F 236/04* | (2006.01) | |

(52) U.S. Cl.
CPC .......... *B01J 20/267* (2013.01); *B01D 53/261* (2013.01); *B01D 53/28* (2013.01); *B01J 20/28016* (2013.01); *B01J 20/28059* (2013.01); *B01J 20/28083* (2013.01); *B01J 20/28095* (2013.01); *B01J 20/3064* (2013.01); *B01J 20/3071* (2013.01); *B01J 20/3085* (2013.01); *C08F 212/08* (2013.01); *C08F 236/045* (2013.01); *B01D 2253/202* (2013.01); *C08F 2810/20* (2013.01)

(58) Field of Classification Search
CPC .... B01J 20/26; B01J 20/267; B01J 20/28016; B01J 20/28059; B01J 20/28083; B01J 20/28095; B01J 20/3064; B01J 20/3071; B01J 20/3085; B01D 53/261; B01D 53/28; B01D 2253/202; C08F 212/08; C08F 236/045; C08F 2810/20
USPC ........................................................ 502/402
See application file for complete search history.

(56) References Cited

U.S. PATENT DOCUMENTS

| | | |
|---|---|---|
| 4,245,053 A | 1/1981 | Nagai et al. |
| 2009/0326086 A1 | 12/2009 | Xu et al. |
| 2016/0286855 A1 | 10/2016 | Branton |

FOREIGN PATENT DOCUMENTS

| | | |
|---|---|---|
| EP | 1724292 A2 | 11/2006 |
| EP | 1840486 A1 | 10/2007 |
| GB | 2339198 A | 1/2000 |
| KR | 10-2014-0008032 A | 1/2014 |
| KR | 10-2016-0101988 A | 8/2016 |
| KR | 10-2016-0148986 A | 12/2016 |
| WO | 2015/095115 A1 | 6/2015 |

*Primary Examiner* — Edward M Johnson
(74) *Attorney, Agent, or Firm* — Dentons US LLP (57) ABSTRACT

The present invention relates to an organic polymer adsorbent, an organic polymer adsorbent composition, and a method for preparing an organic polymer adsorbent and, more specifically, to an organic polymer adsorbent to be used for a ventilation device such as a desiccant dehumidifier. According to the present invention, an adsorbent material is changed to an organic polymer adsorbent such that the mechanical stability and durability of the material itself can be ensured, and the specific surface area of interconnected inner pores and adsorbents and the size of formed pores can be controlled since toluene is contained as a pore generator of the adsorbent. Therefore, the adsorbent of the present invention has superior adsorption performance over that of other conventional organic polymer adsorbents containing a salt-type carboxyl group and has remarkably improved desorption performance, and thus has an effect of very remarkable energy efficiency.

9 Claims, 7 Drawing Sheets

ORGANIC POLYMER ADSORBENT, COMPOSITION OF ORGANIC POLYMER ADSORBENT AND METHOD OF MANUFACTURING THEREOF

This application is a National Phase application of International Application No. PCT/KR2018/000048, filed Jan. 2, 2018, and claims the benefit of KR Patent Application No. 10-2017-0009539 filed on Jan. 20, 2017, all of which are hereby incorporated by reference in their entirety for all purposes as if fully set forth herein.

TECHNICAL FIELD

The present disclosure relates to an organic polymer adsorbent, a composition of an organic polymer adsorbent and a method of manufacturing thereof that is used for a ventilation apparatus such as a dehumidifier.

BACKGROUND ART

Basically, ventilation apparatuses adjust or remove moisture in the air. Among the ventilation apparatuses, a dehumidifier is an apparatus that removes moisture in the air. Conventionally, dehumidifiers usually involve refrigeration dehumidifiers and compressor-type dehumidifiers to which a method of mechanical dehumidification is applied. However, in recent years, desiccant dehumidification using an adsorbent (or drying agent) has attracted public attention as a means to control humidity.

A desiccant dehumidifier is an apparatus that removes moisture in the air on the basis of adsorption of an adsorbent. It has the advantage of making little noise and removing moisture even at low temperatures over a refrigeration dehumidifier or a compressor-type dehumidifier.

In the case of a desiccant dehumidifier, the mechanism for removing moisture in the air is described as follows.

First, an adsorbent is a material that typically includes pores, and a capillary phenomenon is applied to the adsorbent such that a concentration of moisture (gas phase) in a solid (adsorbent) is higher than that of moisture in the air. This is referred to as adsorption. Additionally, moisture that is adsorbed into the surface of the adsorbent is introduced into the solid through the surface layer of the solid. This is referred to as absorption. Thus, the adsorbent is a material that removes moisture in the air through the mechanisms of adsorption and absorption.

Conventionally, inorganic adsorbents are usually used as an adsorbent. The inorganic adsorbents include silica gel, zeolite, activated carbon, activated alumina, molecular sieves and the like. The inorganic adsorbents that adsorb water molecules into their surfaces on the basis of the capillary phenomenon are characterized by their excellent adsorption ability and by being easily treated as a particle.

However, the inorganic adsorbents are easily brittle due to their unique property. Accordingly, they have poor mechanical properties. Specifically, when an inorganic adsorbent is used for a dehumidifier, adsorption and desorption of moisture are repeated over a long period of time. In the process of adsorbing moisture, moisture is adsorbed and then infiltrated into an adsorbent, and in the process of desorbing moisture, the adsorbed and infiltrated moisture is released. Accordingly, the adsorbent experiences slight changes in its volume due to the infiltration and release of moisture. However, an inorganic adsorbent may not absorb displacement resulting from the changes in its volume because of its typical brittleness. Thus, the adsorbent may be cracked or crushed. Finally, the adsorbent may not function rightly.

In general, the inorganic adsorbent has a small specific surface area and removes a small amount of moisture.

To solve this problem, attempts have been made to provide the surface of an inorganic adsorbent with more pores. As a result, the specific surface area of an adsorbent consisting of silica gel is increased up to hundreds of $m^2/g$. However, a significant increase in the specific surface area results in a decrease in the size of pores by a few nanometers. Considering the size of a water particle in the air is generally 2 to 10 nm, a water particle is hardly infiltrated into a pore of about a few nanometers, and even though a water particle is infiltrated into a pore of about a few nanometers, clogging occurs. Accordingly, when there is a significant reduction in the size of a pore, it takes longer to move materials.

In the case of an inorganic adsorbent, a reduction in the size of a pore leads to an increase in the specific surface area, but causes slower reaction time and lower dehumidification speed.

In a desiccant dehumidifier, when high temperature is supplied through the process of regeneration, the phenomenon of desorption in which vapor and gas molecules adsorbed into an adsorbent are separated occurs.

The inorganic adsorbent is strongly adsorbed with water molecules. Accordingly, at the time of desorption, more energy is required for severing the strong adsorption relationship between the inorganic adsorbent and the water molecules. As a result, in the case of an inorganic adsorbent, higher temperature is required for regeneration. However, higher regeneration temperature emerges as a problem when it comes to energy conservation.

As a related art, an adsorption heat exchanging device and a manufacturing method are disclosed in Korean Patent Laid-Open Publication No. 10-2016-0107220.

DISCLOSURE

Technical Problems

One objective of the present disclosure is to provide a new organic polymer adsorbent, as an adsorbent used for a ventilation apparatus such as a desiccant dehumidifier, which has improved mechanical properties and improved adsorption and in which the shape, size, and specific surface area of a pore of the adsorbent itself are controlled to significantly enhance the performance of desorption.

Another objective of the present disclosure is to provide a new composition of an organic polymer adsorbent in which toluene as a pore generator is further included in a composition of an organic polymer adsorbent, which includes an adsorbing constituent, a cross-linking agent, an initiator, an additive and a solvent to manufacture the organic polymer adsorbent.

Yet another objective of the present disclosure is to provide a method of manufacturing the organic polymer adsorbent, which may have an effect unexpected by one having ordinary skill in the art in the performance of adsorption and desorption using the organic polymer adsorbent.

Technical Solutions

One aspect of the present disclosure as a means to solve the above-described problems is to provide an organic polymer adsorbent that includes a pore in which an inner pore of the adsorbent is inter-connected with an outer surface pore of the adsorbent, wherein the inter-connected pore has an average width of 10 to 25 nm and has a specific surface area of 10 to 20 $m^2/g$.

Preferably, the adsorbent is an organic polymer adsorbent that has the shape of a grain or power.

Preferably, the absorbent is an organic polymer adsorbent that includes a hydrophilic polar group as an adsorbing constituent.

In the organic polymer adsorbent, the hydrophilic polar group is a salt-type carboxy group.

In the organic polymer adsorbent, the carboxy group is maleic anhydride

Preferably, the adsorbent is an organic polymer adsorbent that has a cross-linking structure to implement adsorption and enhance durability.

The organic polymer adsorbent includes styrene and divinylbenzene for the cross-linking structure.

Preferably, in the organic polymer adsorbent, a maximum value of ratios of a size of the pore of the adsorbent to volume of the pore is 0.1 or less.

Another aspect of the present disclosure is to provide a composition of an organic polymer adsorbent that includes a salt-type carboxy group, a cross-linking agent, a polymerization initiator, a solvent, and a pore generator, as an adsorbing constituent, wherein the pore generator is toluene.

Preferably, in the composition of an organic polymer adsorbent, the adsorbing constituent is maleic anhydride.

Preferably, in the composition of an organic polymer adsorbent, the cross-linking agent is styrene and divinylbenzene.

Preferably, in the composition of an organic polymer adsorbent, the polymerization initiator is a thermal decomposition initiator.

In the composition of an organic polymer adsorbent, the thermal decomposition initiator is benzoyl peroxide.

Yet another aspect of the present disclosure is to provide a method of manufacturing an organic polymer adsorbent, which includes manufacturing an aqueous solution including a solvent, and a dispersing agent as an additive; manufacturing a monomer solution by dissolving an adsorbing constituent including a salt-type carboxy group, toluene, a cross-linking agent, and a polymerization initiator in a solvent and then bubbling the same with nitrogen; mixing the monomer solution with the aqueous solution; synthesizing a cross-linked polymer for an adsorbent from the mixed solution through heating and agitation; washing and drying the cross-linked polymer; and hydrolyzing the cross-linked polymer.

Preferably, in the method of manufacturing an organic polymer adsorbent, the adsorbing constituent is maleic anhydride.

In the method of manufacturing an organic polymer adsorbent, the cross-linking agent is styrene and divinylbenzene.

Preferably, in the method of manufacturing an organic polymer adsorbent, the polymerization initiator is a thermal decomposition initiator.

In the method of manufacturing an organic polymer adsorbent, the thermal decomposition initiator is benzoyl peroxide.

Preferably, in the method of manufacturing an organic polymer adsorbent, agitation temperature is about 80° C. or higher in the steps of heating and agitation.

In the method of manufacturing an organic polymer adsorbent, agitation speed is about 100 rpm in the steps of heating and agitation.

Advantageous Effects

According to the present disclosure, the adsorbent, that uses an organic polymer adsorbent instead of a conventional inorganic adsorbent as a material, may ensure ductility. Thus, the organic polymer adsorbent of the present disclosure itself may absorb displacement that can occur when moisture is adsorbed and desorbed, thereby ensuring mechanical stability and durability.

According to the present disclosure, the adsorbent includes a pore where an outer surface pore of the adsorbent is inter-connected with an inner pore of the adsorbent, and accordingly, is provided with more paths for adsorbing and desorbing moisture, thereby suppressing clogging at the time of adsorption despite a decrease in the size of a pore, and is provided with more paths for allowing moisture to escape at the time of desorption, thereby ensuring improved energy efficiency.

According to the present disclosure, the size and specific surface area of a pore of the organic polymer adsorbent itself are controlled, and accordingly, the adsorbent has an adsorption ability more excellent than that of another organic polymer adsorbent including a conventional salt-type carboxy group and has a significantly improved desorption ability, thereby ensuring excellent energy efficiency.

According to the present disclosure, the composition of the organic polymer adsorbent includes a salt-type carboxy group as an adsorbing constituent as well as toluene as a pore generator, thereby increasing the size and specific surface area of a pore of the adsorbent. As a result, the composition of the organic polymer adsorbent may provide an organic polymer adsorbent that has a significantly improved ability to adsorb and desorb moisture unlike a conventional inorganic adsorbent or another organic polymer adsorbent Additionally, according to the method of manufacturing the organic polymer adsorbent of the present disclosure, agitation temperatures and speeds that make it possible to manufacture an organic polymer adsorbent with excellent abilities to adsorb and desorb moisture may be ensured.

BEST MODE

Below, an organic polymer adsorbent, a composition for an organic polymer adsorbent, and a method of manufacturing thereof according to preferred embodiments are specifically described with reference to the attached drawings.

The inventive subject matter may be embodied in various different forms, and should not be construed as being limited only to embodiments set forth below. Rather, the embodiments are provided as examples so that this disclosure will be thorough and complete, and will fully convey the inventive subject matter to those skilled in the art.

First, a method of evaluating properties of various adsorbents that are used in the present disclosure, and results of the evaluation are described.

A shape of the organic polymer adsorbent that is manufactured according to the present disclosure was observed with a scanning electron microscope, and sizes of a particle and a pore were measured with TriStar II 3020.

A theory of analyzing sizes of a particle and a pore is described as follow.

In general, states of the atoms on the surfaces of solids are less stable than those of the atoms inside the solids because connections between the atoms on the surfaces of solids are partially cut. Accordingly, when gas molecules collide with the surface of a solid in different directions at different speeds, the gas molecules may be attached to the surface of the solid or partially separated. If there is a change in pressure, temperature and the like, gas may be condensed on the surface of a solid. This phenomenon happens by means of Van der Walls forces and is referred to as adsorption. The phenomenon is similar to a phenomenon in which water vapor is condensed on the surface of the window when it's cold outside.

On the other hand, a phenomenon in which condensed gas molecules, i.e. adsorbed gas molecules, are separated (evaporated) from the surface of a solid is referred to as desorption. Adsorption and desorption are determined based on temperature of the surface of a solid, properties of gases, given pressures, and the like.

Pressures of gases occur by means of collision of gas molecules with the surface of a solid and the like. Pressures may be generally measured using a pressure sensor and the like in a container having a certain capacity. Accordingly, when gas is adsorbed into and/or desorbed from the inner surface of a solid, i.e., a container, or other solids by a change in temperature in a sealed container with no change in conditions, it means that some molecules in a given amount of gas are adsorbed and/or desorbed. Thus, adsorption and/or desorption may be sensed by measuring pressure inside a container. This is a basic theory of the adsorption capacity method.

The volume of adsorbed gas, and the number of molecules may be calculated by measuring pressure. Additionally, the surface areas of a desired solid, a pore, and the like may also be calculated by measuring pressure.

A specific surface area that is measured in the present disclosure is an exposed surface area of a solid sample, which is measured at the microscopic scale. Brunauer-Emmet-Teller (BET) theory is the most commonly used theory in determining a surface area. Samples are generally heated and simultaneously vacuumed, or gas is allowed to flow over the samples, to remove freed impurities. Next, prepared samples are cooled by liquid nitrogen, and volume of gas (commonly nitrogen gas) absorbed at a specific pressure is measured, to analyze the surface areas of the samples. In the present disclosure, specific surface areas were measured with TriStar II 3020 Surface Area and Porosity System.

In the present disclosure, an isotherm was recorded from low pressures to saturation pressures (approximately 1 atm) to measure volume of pores with the gas adsorption method. A range of pressures is determined on the basis of a range of sizes of pores subject to measurement. Isotherms of micro-pore materials are measured in a range of pressures approximately from 0.00001 torr to 0.1 torr. Isotherms of meso-pore materials are usually measured in a range of pressures from 1 torr to 760 torr. Once isotherms are accurately expressed as pairs of data of a series of pressures to amounts absorbed, other methods (theories or models) used for determining distributions of sizes of pores may be applied. The pore in the present disclosure is a meso pore. Accordingly, the Barrett, Joyner and Halenda (BJH) analysis was applied, and the sizes of pores were measured using TriStar II 3020.

The performance of adsorption and desorption of the organic polymer adsorbent of the present disclosure was measured with the following method and device.

In the present disclosure, an isothermal-isohumidity chamber (Model: PR-2KPH, Company: ESPEC) was used to evaluate the performance of adsorption and desorption, and a natural circulation dry oven (Model: DS-DO150, Company: DongSeo Science) was used to dry an adsorbent.

To evaluate the performance of adsorption, an adsorbent was evenly distributed in a petri dish and then was put into an oven. Next, the adsorbent was dried in the oven at a temperature of 120° C. for 30 minutes. The dried adsorbent was put into an isothermal-isohumidity chamber of 20° C. and RH 40, 60, and 80% for three minutes again. Then a change in the weight of the adsorbent before and after the adsorbent was put into the isothermal-isohumidity chamber was measured.

To evaluate the performance of desorption, the adsorbent used to evaluate the performance of adsorption was exposed in the isothermal-isohumidity chamber for two hours to saturate the adsorbent with moisture. In this case, the conditions of the isothermal-isohumidity chamber were 20° C./RH 60, and 80%. The weight of the adsorbent exposed for two hours was measured, and then a change in the weight of the adsorbent was measured after the adsorbent was exposed in the isothermal-isohumidity chamber at 40° C./RH 40% for 20 minutes.

Figure 1:
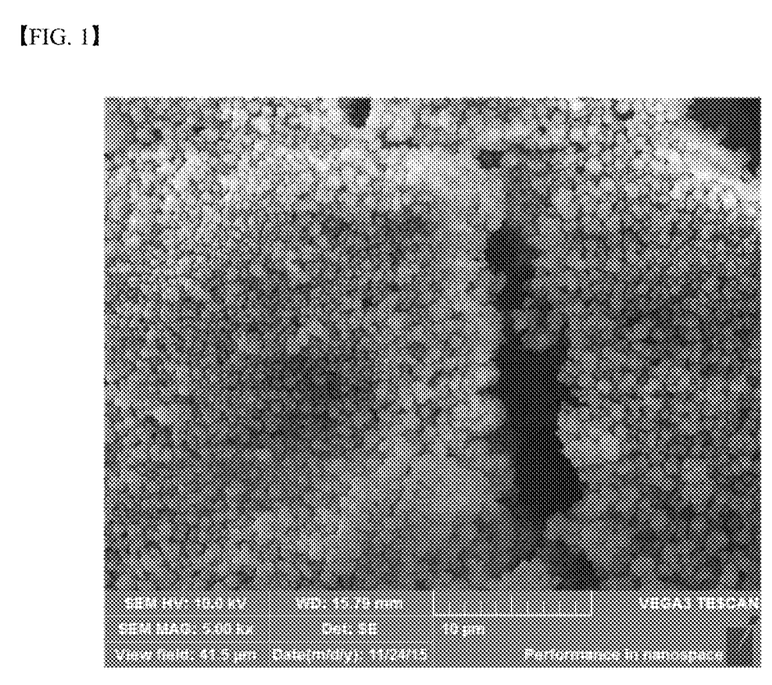
FIG. 1 is an electron microscopic view illustrating an organic polymer adsorbent of the present disclosure, which is manufactured using toluene as a pore generator.
Figure 2:
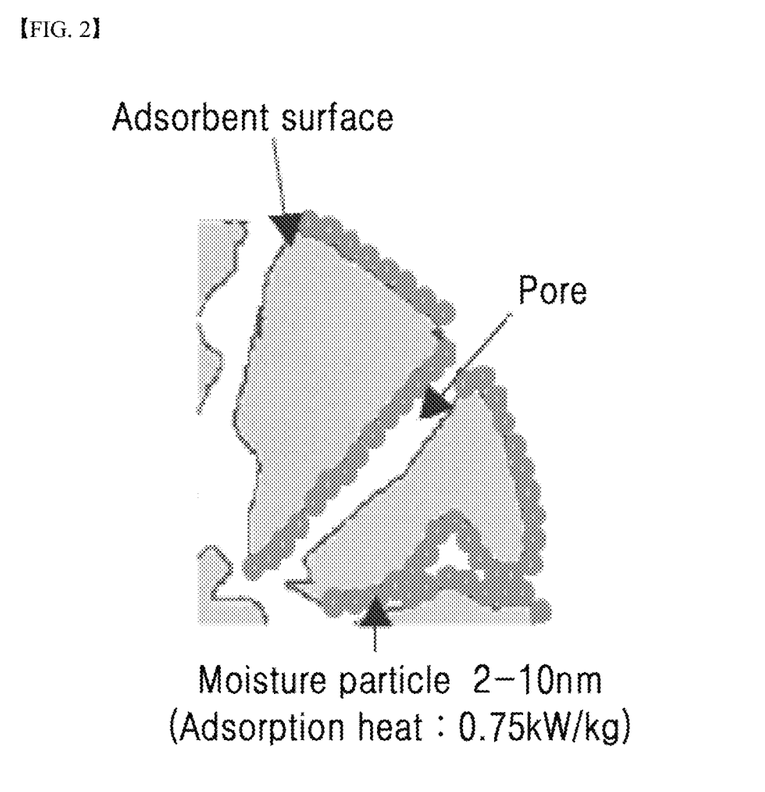
FIG. 2 is a mimetic view I schematically illustrating an organic polymer adsorbent of the present disclosure.
Figure 3:
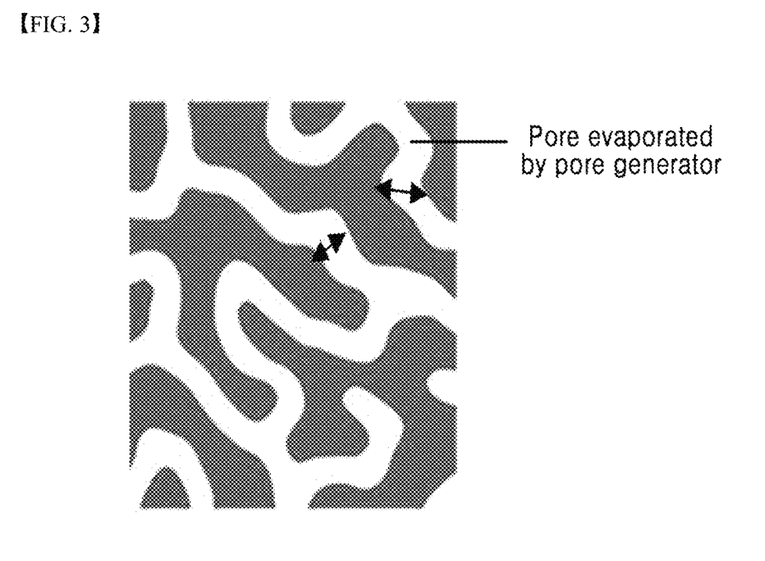
FIG. 3 is a mimetic view II schematically illustrating an organic polymer adsorbent of the present disclosure.

FIG. 1 illustrates an organic polymer adsorbent, manufactured using toluene as a pore generator according to the present disclosure and a observed by a scanning electron microscope, and FIGS. 2 and 3 are mimetic views schematically illustrating the adsorbent observed in FIG. 1 such that the adsorbent may be better understood.

As illustrated in FIGS. 1 to 3, an organic polymer adsorbent according to the present disclosure includes a pore where an outer surface pore of the adsorbent is interconnected with an inner pore of the adsorbent. Accordingly, the adsorbent allows moisture in the air to be adsorbed into the inter-connected pore, and depending on conditions, allows moisture to be easily desorbed. In the present disclosure, a shape of the surface area of the adsorbent is not limited. The adsorbent may have any shape such as a smooth shape, an uneven shape and the like. Additionally, the adsorbent may be provided with more paths for adsorbing moisture by inner pores that are inter-connected to each other, and may be provided with more paths for allowing moisture to escape by pores that are not isolated but interconnected, when the moisture is desorbed, thereby facilitating moisture desorption.

The adsorbent according to the present disclosure is an organic polymer adsorbent in which a pore has an average size of 10 to 25 nm and which has a specific surface area of 10 to 20 $m^2/g$.

When a pore has an average size of less than 10 nm, a specific surface area of the adsorbent is increased, but the size of the pore is too small for a moisture particle to be adsorbed. Accordingly, dehumidification speed is significantly lowered due to clogging. When a pore has an average size of greater than 25 nm, moisture particles may move with no difficulty, but the specific surface area of the adsorbent is significantly reduced, thereby decreasing a total amount of adsorbed moisture.

When the specific surface area of the adsorbent is less than 10 $m^2/g$, moisture particles may move with no difficulty, but a total amount of adsorbed moisture is decreased due to quite a small specific surface area. When the specific surface area of the adsorbent is greater than 20 $m^2/g$, a total amount of adsorbed moisture may be increased by a wider specific surface area, but dehumidification speed is lowered due to clogging. Accordingly, an increase in an actual amount of adsorbed moisture is not proportional to an increase in a specific surface area.

Referring to FIG. 1, the organic polymer adsorbent according to the present disclosure has a grain shape or a power shape.

The adsorbent that is manufactured according to the present disclosure is synthesized in a usual polar solvent. Accordingly, a final adsorbent has a shape that may reduce interfacial energy i.e., a grain shape because materials of components actively move in a liquid phase solvent. The adsorbent may be readily applied to a final product (e.g., a metallic plate of a dehumidifier, and the like) in the form of liquid such as an application solution and gas such as spray because the adsorbent has the shape of a grain.

When necessary, additives may be used in a method for forming the organic polymer adsorbent according to the present disclosure on a metallic surface to the extent that properties of moisture adsorption, moisture desorption and the like of the present disclosure are not significantly undermined. Various thermal polymerization inhibitors, leveling agents, thickeners, viscosity-lowering agents, thixotropy-imparting agents, halation-preventing agents, polish-removing agents, colored pigments, diluents, fillers, reinforcing agents, thermoplastic resins and the like may be optionally used as the additive.

Further, when necessary, organic polymeric sorbents, or materials that serves as a binder for further reinforcing a coupling of a sorbent layer and metal may be added. For instance, organic binders include melamine resins, urea resins, phenolic resins, epoxy resins, polyvinyl alcohol, polyvinyl acetate, acrylic resins, polyacrylic acid, polymethacrylic acid urethane resins and the like, or inorganic binders include silicate, colloidal silica and the like. An amount of the added binders may be determined to the extent that properties of the present disclosure may be implemented. However, most of the binders tend to undermine the adsorption ability. Preferably, a small amount of sorbents may be added.

The organic polymer adsorbent of the present disclosure includes hydrophilic polar groups that may readily react with moisture to adsorb moisture.

In general, hydrophilic polar groups include a carboxy group, a sulfonic acid group, a phosphoric acid group, a sulfate group, a primary amino group, a secondary amino group, a tertiary amino group, a quaternary amino group, and a salt compound thereof, a nitro group, an aldehyde group, an amino group, a nitrile group, a mercapto group, a hydroxyl group and the like. Among them, the carboxy group, sulfonic acid group, phosphoric acid group and sulfate group are preferable.

The adsorbent of the present disclosure includes a salt-type carboxy group because the salt-type carboxy group has an excellent adsorption ability. The salt that constitutes salt compounds by reacting with negative ion groups such as the carboxy group, sulfonic acid group, phosphonic acid group, sulfate group and the like is not limited as long as a salt may form a salt structure with negative ion groups such as the carboxy group and the like. For example, the salt include alkali metals such as Li, Na, K and the like, alkali earth metals such as Be, Mg, Ca and the like, other metals, organic positive ions such as $NH_4$, amines and the like, and the like.

The adsorbent in the present disclosure includes maleic anhydride as a salt-type carboxy group. This is because the method of chemical denaturalization is used as a method for introducing a salt-type carboxy group in the present disclosure.

In the method of introducing a carboxy group using chemical denaturalization, a homopolymer of a monomer that contains a functional group capable of being converted into a carboxy group through chemical denaturalization, or a copolymer that consists of two or more of the monomers, or the monomer is polymerized with another monomer capable of copolymerization. Then the obtained polymer is converted into a carboxy group through hydrolysis. When the type of the obtained polymer is not a salt, the method of manufacturing a salt-type carboxy group is applied to the converted carboxy group. Monomers to which the above-described method may be applied include monomers containing a nitrile group such as acrylonitrile, methacrylonitrile and the like; anhydrides of monomers containing a carboxylic acid group such as acrylic acid, methacrylic acid, maleic acid, itaconic acid, vinyl propionic acid and the like or an ester derivative, an amide derivative, a cross-linkable ester derivative and the like.

Additionally, anhydrides of monomers containing a carboxylic acid group includes maleic anhydride, acrylic anhydride, methacrylic anhydride, itaconic anhydride, phthalic anhydride, n-phenylmaleimide, n-cyclo maleimide and the like.

The method of introducing a salt-type carboxy group through hydrolysis of a polymer is not limited, and conventional conditions for hydrolysis may be used. For example, a salt-type carboxy group is introduced into a polymer, in which the monomer is polymerized and cross-linked, using an alkali metal hydroxide such as sodium hydroxide, lithium hydroxide, potassium hydroxide or a basic aqueous solution such as ammonia and the like, or a salt-type carboxy group is introduced through ion exchange by reacting the polymer with an inorganic acid such as nitric acid, sulfuric acid, hydrochloric acid, and the like, or an organic acid such as formic acid, acetic acid and the like to obtain a carboxylic acid group and then by mixing the carboxylic acid group with an alkali metal salt.

The organic polymer adsorbent of the present disclosure necessarily has a cross-linking structure to have excellent adsorption and desorption abilities and to ensure durability for maintaining stability in the shape despite displacement that is caused by changes in volume at the time of adsorption and desorption. Cross-linking structures include a cross-linking structure by a covalent bond, by an ionic bond, by an interaction between molecules of a polymer or by a crystal structure and the like, but are not limited as long as the performance of adsorption and desorption, and the performance of a product that adsorbs and desorbs moisture are not undermined.

In the case of an organic polymer adsorbent of the present disclosure, which contains a salt-type carboxy group, a cross-linked polymer having a cross-linking structure based on a covalent bond may be obtained by performing copolymerization using a cross-linkable monomer that may be copolymerized with the above-described monomer containing a carboxy group, or capable of being converted into a carboxy group. However, in this case, the cross-linkable monomer has to be a cross-linkable monomer that is not or hardly affected by acidic conditions shown by acrylic acid and the like which are a monomer, or that is not or hardly affected by a chemical effect (e.g., hydrolysis and the like) at the time when a polymer is converted into a carboxy group.

In the organic polymer adsorbent of the present disclosure, styrene and divinylbenzene are used as cross-linking agents. In the step of polymerizing a monomer, cross-linkable monomers that may be used in the method by which a cross-linkable monomer is used are not limited. The cross-linkable monomers, for example, include cross-linkable vinyl compounds such as glycidyl, methacrylate, n-methylolacryamide, triallyl isocyanurate, triallyl cyanurate, divinyl benzene, hydroxyethyl methacrylate, diethylene glycol di(meth)acrylate, triethylene glycol di(meth)acrylate, trimethylolpropane tri(meth)acrylate, methylenebisacrylamide and the like. Among the cross-linkable monomers, a cross-linking structure by triallylcyanurate, divinylbenzene, and methylenebisacrylamide are preferable because they are chemically stable during hydrolysis and the like that are applied to a cross-linked molymer containing triallyl cyanurate, divinyl benzene, and methylene-bis-acrylamide, and that is used to introduce a carboxy group.

According to the present disclosure, in the above-described method of polymerizing the monomer, benzoyl peroxide, a sort of thermal decomposition polymerization initiator, was used as a polymerization initiator. However, in addition to the thermal decomposition polymerization initiator, other commonly-used polymerization initiators may be used. The method of polymerizing monomers is not limited. In addition to the method using thermal decomposition polymerization initiators, methods using oxidation-reduction initiators that may be polymerized even at low temperature, or methods using energy rays such as electron rays, ultraviolet rays and the like may produce good results.

Other thermal decomposition initiators that may be used instead of benzoyl peroxide used in the present disclosure include peracid-based initiators such as peroxide-di-t-butyl, diisopropyl peroxydicarbonate, 2,4-dichlorobenzoylperoxide, lauroyl peroxide, cyclohexanone peroxide, tert-butyl perbenzoate, dicumyl peroxide, di-tert-butyl peroxide, p-menthane hydroperoxide, phinan hydroperoxide, cumene hydroperoxide, acetyl peroxide, potassium persulfate, ammonium persulfate and the like; azo-based initiators such as azobisisobutyronitrile, methyl azobisisobutyrate, azobis-2,4-dimethyl valeronitrile, azobiscyclohexane carbonitrile, azobisisobutyl amidine hydrochloride, 4,4'-azobis-4-cyanovaleric acid and the like.

Oxidation-reduction initiators include a combination of cumene hydroperoxide or dialkylperoxide and amine, polyamine, an iron salt; hydrogen peroxide and ammonia, ethylamine, an iron salt; potassium persulfate or ammonium persulfate and sodium sulfite, sodium hydrogensulfite, triethanolamine, an iron salt; sodium perchlorate and sodium sulfite; cerium sulfate and alcohol, amine, starch and the like.

Further, commonly-used sensitizers may be used in the methods using energy rays such as electron rays, ultraviolet rays and the like. The sensitizers, for example, include carbonyl compounds such as acetone, biacetyl, benzil, benzoin, benzanthrone, benzophenone, cyclohexanone, acetylacetone and the like; sulfur compounds such as thiophenol, thiocresol, 2-mercaptobenzimidazole, mercaptobenzoxazole, mercaptobenzthiazole, methyl dithiocarbamate, diphenyl sulfide, diphenyl disulfide, dibenzoyl disulfide, dibenzthiazoyl disulfide, tetraalkylthiuram sulfide, tetraalkylthiuram disulfide, thioxanthone, 2-isopropyl thioxanthone, 2,4-diethyl thioxanthone and the like; halogen compounds such as bromopropane, chlorocyclohexane, and chloromethylnaphthalene and the like; amino compounds such as triethylamine, diethylamine, diethanolamine, ethanolamine, dimethylaminobenzoic acid, methyl dimethylaminobenzoate and the like; the above-described peroxides or azobis compounds; color-based sensitizers such as rhodamine, erythrosine, acriflavine, riboflavin, eosin, fluorescein, isocyan, pinacyanol halide, kryptocyanine and the like. When necessary, the above-described thermal decomposition initiators or oxidation-reduction initiators may be mixed.

When a maximum value of a ratio of a size (width) of a pore to volume of the pore becomes smaller, the organic polymer adsorbent according to the present disclosure may have an excellent adsorption ability. Preferably, a maximum value of a ratio of a size (width) of a pore to volume of the pore is less than 0.1.

There is little change in the sizes (16 to 19 nm) of pores despite different pore generators. An adsorbent having a form with a low pore volume rate (in the case in which toluene is used as a pore generator) has an excellent adsorption ability. On the basis of this, in an adsorbent with a low pore volume, the outer surface of the adsorbent has more pores than the inside of the adsorbent, or outer surface pores and inner pores are inter-connected, thereby easily contacting moisture. On the contrary, in an adsorbent with a high pore volume (a high volume of pores at the same volume), pores exist as an isolated pore that is isolated inside the adsorbent, thereby undermining the performance of adsorption.

In the present disclosure, when a rate of pores in which outer surface pores and inner pores are inter-connected, among the entire pores, becomes higher, the performance of adsorption may improve. Preferably, when the rate of pores in which outer surface pores and inner pores are inter-connected is 75% or more, dehumidification, and desorption of moisture may be readily performed. In the present disclosure, the rate of inter-connected pores is not limited. However, when a rate of inter-connected pores is greater than a rate of isolated pores, the organic polymer adsorbent of the present disclosure may provide significant advantages over other adsorbents.

Figure 4:
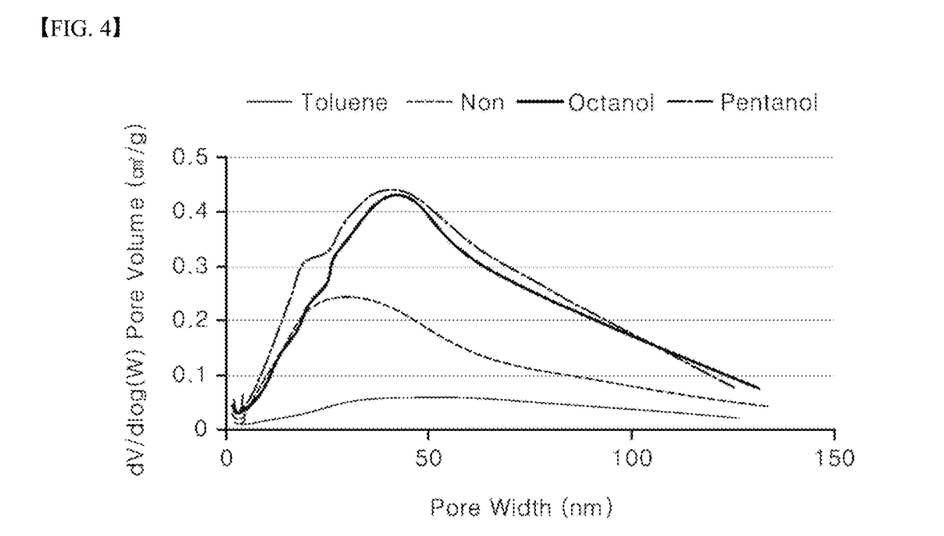
FIG. 4 is a view illustrating changes in a ratio of a pore width (nm) to a pore volume ($cm^3/g$) according to a pore generator.

As illustrated in FIG. 4, when a maximum value of a ratio of sizes of pores to volume of the pores is 0.1 or less, a rate of isolated pores was smaller than a rate of the inter-connected pores. According to the present disclosure, rates of the inter-connected pores and isolated pores may be specified by limiting a pore volume rate.

Below, a composition of an organic polymer adsorbent and a method of manufacturing an organic polymer adsorbent using the same according to the present disclosure are described.

First, as a solvent, an aqueous solution in which a dispersing agent as an additive was put into 90 mℓ of D.I. water was agitated and heated. Then the aqueous solution bubbles with nitrogen.

Next, as a monomer solution, maleic anhydride as an adsorbing constituent, and styrene and divinylbenzene as a cross-linking agent were respectively added at a mole ratio of 60:40:3. Additionally, benzoyl peroxide as a thermal initiator, and no pore generator or 20 mℓ of a pore generator were added to the monomer solution and then the monomer solution bubbled with nitrogen. Embodiments and comparative examples were compared based on each of the cases in which toluene was added as a pore generator, in which no pore generator was added, in which pentanol was added as a pore generator, and in which octanol was added as a pore generator.

Then the aqueous solution, and each of the monomer solutions with or without a pore generator were mixed.

Then the mixture was heated and agitated such that a cross-linking reaction of a polymer for an adsorbent was sufficiently performed. In this case, properties of adsorption and desorption of an organic polymer adsorbent that was finally manufactured by making changes in agitation temperatures and agitation speeds were evaluated.

A cross-linked polymer for an organic polymer adsorbent was obtained after the heating and agitation. While a solution, in which a solute containing 10 g of sodium hydroxide as a hydrolysis agent, and 10 g of the cross-linked polymer, a surfactant and the like as an additive was dissolved in a solvent where 200 mℓ of ethanol and 50 mℓ of D.I. water were mixed, was being heated, the solution experienced hydrolysis. Then the cross-linked polymer was filtered to finally manufacture an organic polymer adsorbent.

Embodiment 1

Figure 5:
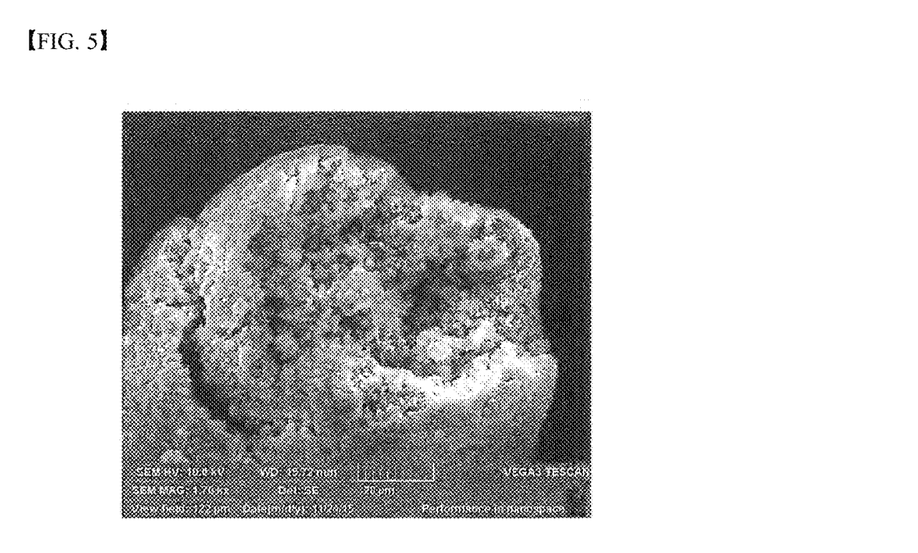
FIG. 5 is an electron microscopic view illustrating an organic polymer adsorbent that does not include a pore generator.
Figure 6:
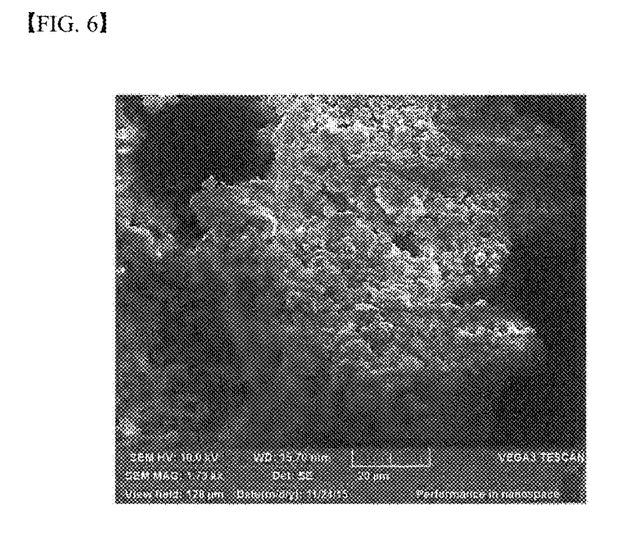
FIG. 6 is an electron microscopic view illustrating an organic polymer adsorbent that is manufacture using pentanol as a pore generator.
Figure 7:
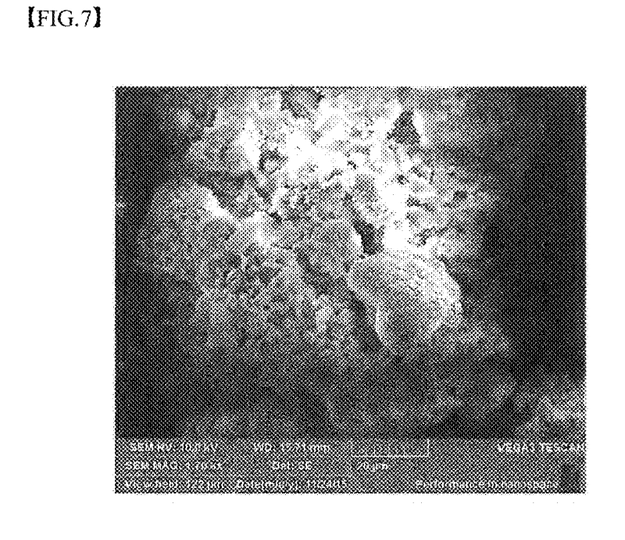
FIG. 7 is an electron microscopic view illustrating an organic polymer adsorbent that is manufacture using octanol as a pore generator.

FIGS. 5 to 7 are electron microscopic views illustrating organic polymer adsorbents that did not contain a pore generator or that did not use toluene of the present disclosure as a pore generator in the method of manufacturing the organic polymer adsorbent according to the present disclosure.

In comparison between FIG. 1 and FIGS. 5 to 7, there was no big difference in the shape and the like of each adsorbent in the observed microstructure.

TABLE 1

Specific surface area and pore size of organic polymer adsorbent based on pore generator

| Pore generator | Specific surface area (m²/g) | Pore size (nm) |
|---|---|---|
| Toluen (Embodiment 1) | 15.56 | 16.49 |
| Non (Comparative example 1) | 57 | 17 |
| Pentanol (Comparative example 2) | 81.55 | 18.05 |
| Octanol (Comparative example 3) | 75.26 | 19.03 |

Unlike the results of observing the microstructures, the specific surface areas and pore sizes of the organic polymer adsorbents varied depending on the sort of the pore generators. Table 1 shows that embodiment 1 that used toluene as a pore generator has a specific surface area smaller than that of comparative example 1 that did not use a pore generator, or comparative example 2 and comparative example 3 that used pentanol and octanol respectively as a pore generator while embodiment 1 has a pore size similar to that of comparative example 1, comparative example 2, and comparative example 3.

Figure 8:
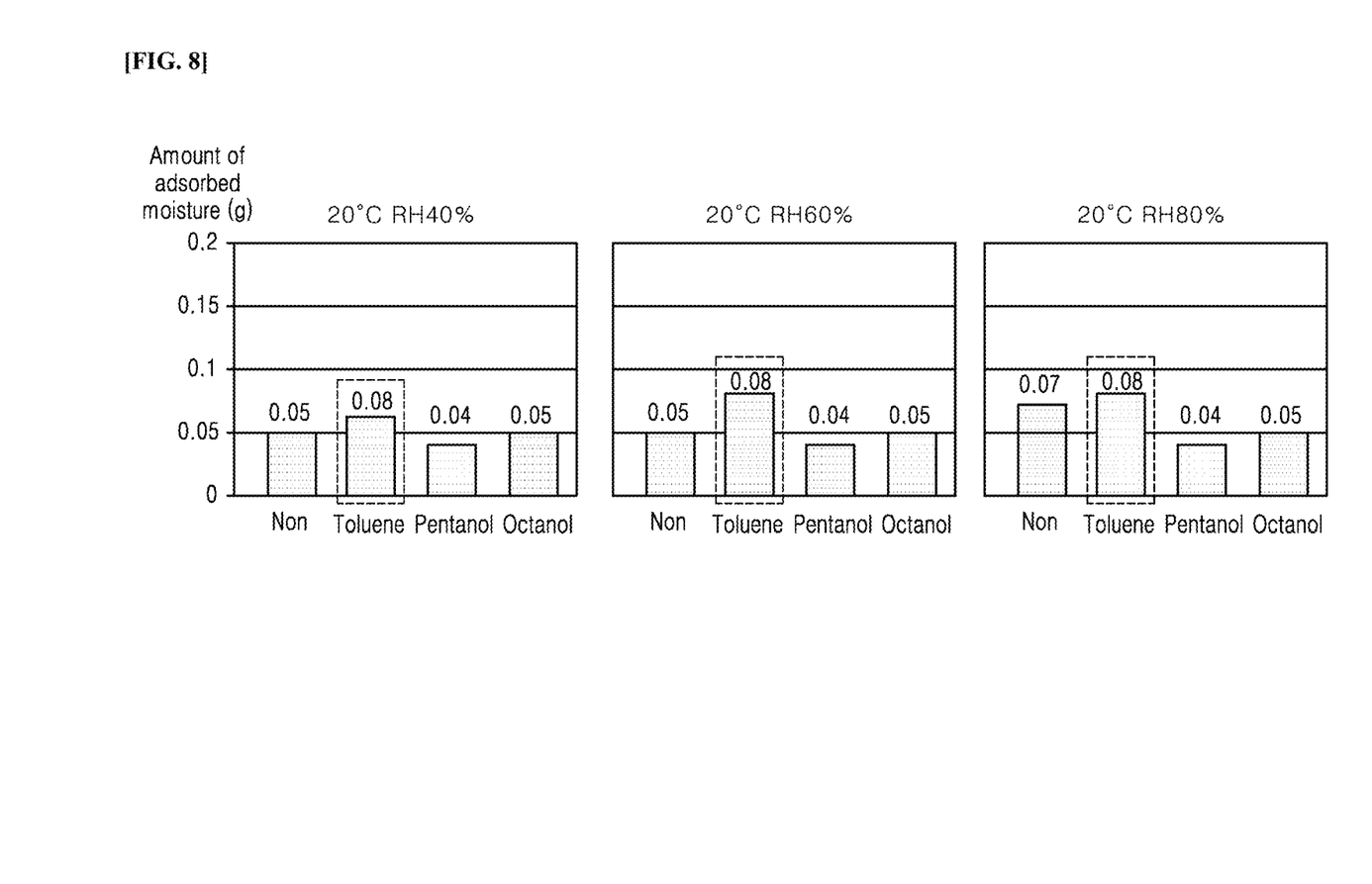
FIG. 8 is a view illustrating results of comparison between amounts adsorbed by organic polymer adsorbents that are manufactured using different pore generators, based on indoor humidity.

FIG. 8 shows absolute values of amounts of moisture adsorbed by embodiment 1 and comparative examples 1 to 3 at room temperature (20° C.). The amounts of adsorbed moisture in FIG. 8 were measured in the state in which 1 g of the adsorbent was kept at room temperature (20° C.) and various humidity conditions for three hours.

Embodiment 1 has an amount of adsorbed moisture greater than that of comparative examples 1 to 3 in the entire relative humidity conditions. There was little change in the quantity of adsorbed moisture of comparative examples 1 to 3 even when relative humidity became higher or there was an increase in the quantity of adsorbed moisture of comparative examples 1 to 3 when relative humidity significantly rose from 40% to 80%. On the contrary, the quantity of adsorbed moisture of embodiment 1 significantly increased even when relative humidity slightly rose from 40% to 60%. This clearly indicates that the ability of the organic polymer adsorbent of the present disclosure, which used toluene as a pore generator, to remove moisture is more excellent than that of each of the comparative examples at all relative humidity conditions and low humidity conditions.

Embodiment 2

Figure 9:
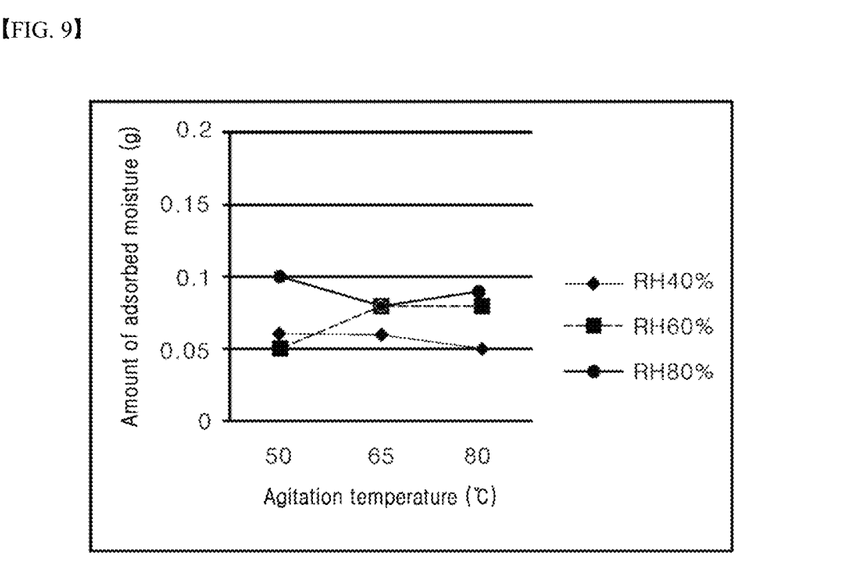
FIG. 9 is a view illustrating results of comparison between amounts of moisture adsorbed by organic polymer adsorbents of the present disclosure, based on agitation temperatures.
Figure 10:
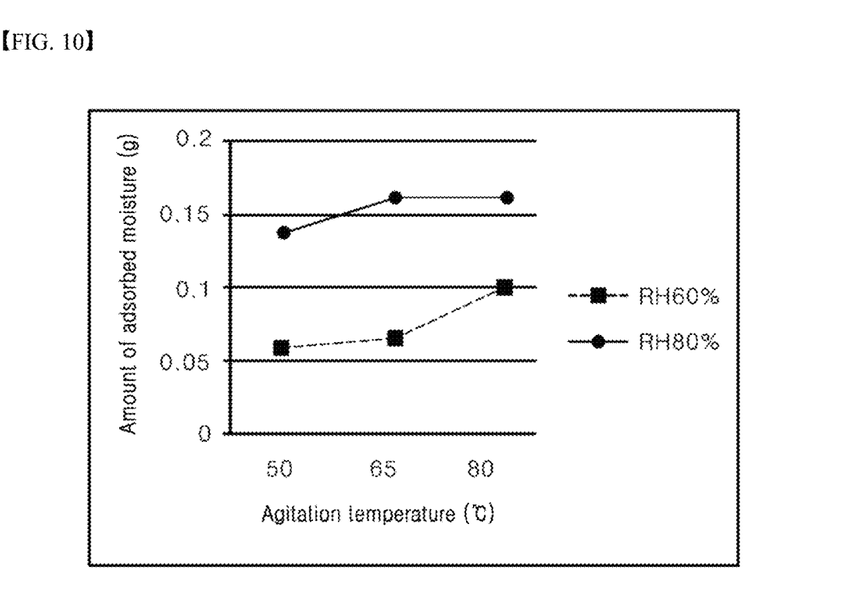
FIG. 10 is a view illustrating results of comparison between amounts of moisture desorbed by organic polymer adsorbents of the present disclosure, based on agitation temperatures.

FIGS. 9 and 10 show results of measuring amounts of adsorbed and desorbed moisture on the basis of agitation temperatures in the steps of heating and agitation among the steps in the method of manufacturing the organic adsorbent according to the present disclosure.

When relative humidity was high (80%), there was a minor change in the amount of adsorbed moisture based on agitation temperatures (FIG. 9). However, as relative humidity dropped to 60% or less, the amount of adsorbed moisture changed according to agitation temperatures. At an agitation temperature of 65° C. or greater, the amount of adsorbed moisture was saturated or maximized.

In the amount of desorbed moisture based on agitation temperatures (FIG. 10), when moisture was desorbed at relative humidity of 40% after moisture was adsorbed at temperature of 20° C. and relative humidity of 60%, the amount of desorbed moisture was maximized at an agitation temperature of 80° C. Additionally, when moisture was desorbed at a temperature of 40° C. and relative humidity of 40% after moisture was adsorbed at a temperature of 20° C. and relative humidity of 80%, the amount of desorbed moisture was saturated from an agitation temperature of 65° C.

From the experimental results in FIGS. 9 and 10, a preferable agitation temperature is 65° C. or greater when it comes to the amounts of adsorbed and desorbed moisture. Further, the most preferable agitation temperature is 80° C. At temperature of 80° C., the amount of desorbed moisture was maximized.

Embodiment 3

Figure 11:
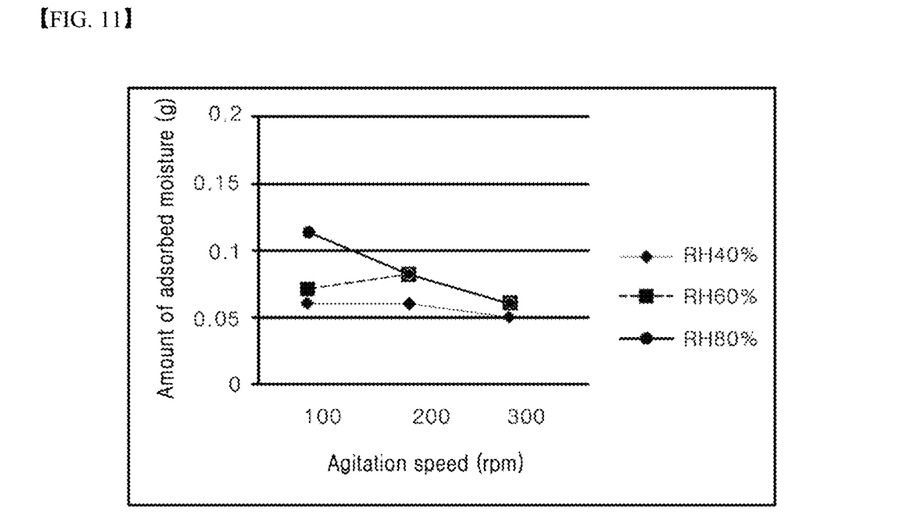
FIG. 11 is a view illustrating results of comparison between amounts of moisture adsorbed by organic polymer adsorbents of the present disclosure, based on agitation speeds.
Figure 12:
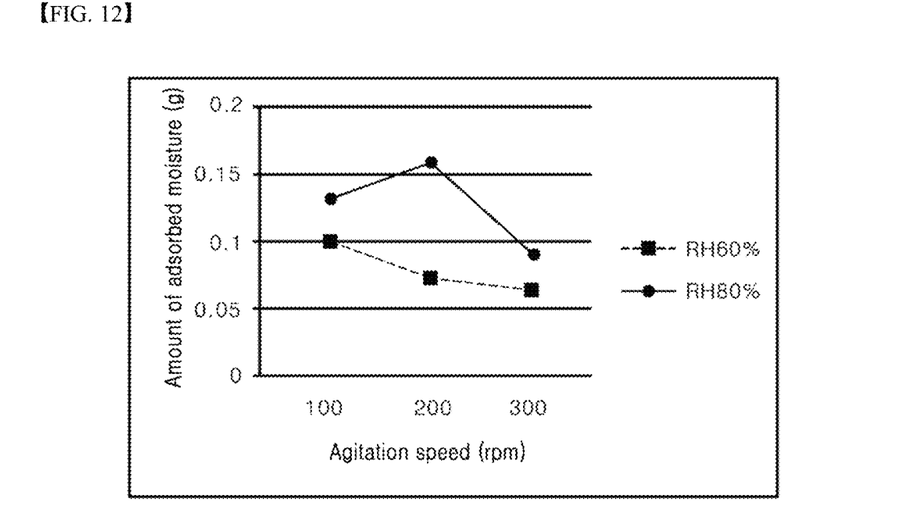
FIG. 12 is a view illustrating results of comparison between amounts of moisture desorbed by organic polymer adsorbents of the present disclosure, based on agitation speeds.

FIGS. 11 and 12 show results of measuring amounts of adsorbed and desorbed moisture on the basis of agitation speeds (rpm) in the steps of heating and agitation among the steps in the method of manufacturing the organic adsorbent according to the present disclosure.

When relative humidity was low (40 to 60%), there was a minor change in the amount of adsorbed moisture based on agitation speeds (FIG. 11). However, as relative humidity rose to 80%, the amount of adsorbed moisture significantly changed according to agitation speeds. The amount of adsorbed moisture was maximized particularly at an agitation speed of 100, and as the agitation speed increased thereafter, the amount of adsorbed moisture decreased.

In the amount of desorbed moisture based on agitation temperatures (FIG. 12), when moisture was desorbed at relative humidity of 40% after moisture was adsorbed at temperature of 20° C. and relative humidity of 60%, the amount of desorbed moisture was maximized at an agitation speed of 100. As the agitation speed increased thereafter, the amount of adsorbed moisture decreased. When moisture was desorbed at temperature of 40° C. and relative humidity of 40% after moisture was adsorbed at temperature of 20° C. and relative humidity of 80%, the amount of desorbed moisture was maximized at an agitation speed of 200.

From the results in FIGS. 11 and 12, when relative humidity becomes higher, the amounts of adsorbed and desorbed moisture increase, and as a whole, when agitation speed is 100, adsorption and desorption of moisture are excellently performed.

The present disclosure has been described in relation to its preferred embodiments. It will be apparent to those skilled in the art to which the present invention pertains that other modifications and changes may be made without departing from the spirit and scope of the invention. Additionally, it is to be understood that although effects of configurations of the disclosure are not explicitly described in the description of the embodiments, effects that may be expected from the configurations are included within the scope of the disclosure.

The invention claimed is:

1. An organic polymer adsorbent comprises a pore in which an inner pore of the adsorbent is inter-connected with an outer surface pore of the adsorbent, wherein the inter-connected pore has an average width of 10 to 25 nm and has a specific surface area of 10 to 20 $m^2/g$, and wherein the adsorbent comprises maleic anhydride.

2. The organic polymer adsorbent of claim 1, wherein the adsorbent has the shape of a grain or power.

3. The organic polymer adsorbent of claim 1, wherein the adsorbent has a cross-linking structure.

4. The organic polymer adsorbent of claim 3, wherein the adsorbent comprises styrene and divinylbenzene.

5. The organic polymer adsorbent of claim 1, wherein a maximum value of ratios of a size of the pore of the adsorbent to volume of the pore is 0.1 or less.

6. A composition of an organic polymer adsorbent, comprising: as an adsorbing constituent, maleic anhydride;
a cross-linking agent;
a polymerization initiator;
a solvent; and
a pore generator,
wherein the pore generator is toluene.

7. The composition of an organic polymer adsorbent of claim 6, wherein the cross-linking agent is styrene and divinylbenzene.

8. The composition of an organic polymer adsorbent of claim 6, wherein the polymerization initiator is a thermal decomposition initiator.

9. The composition of an organic polymer adsorbent of claim 8, wherein the thermal decomposition initiator is benzoyl peroxide.

* * * * *